3,557,008
ANIMAL FAT CLEANING COMPOSITION
AND METHOD
William H. Jennings, Norfolk, Va., assignor to Jennings Development Corporation, Virginia Beach, Va., a corporation of Virginia
No Drawing. Filed May 8, 1967, Ser. No. 640,774
Int. Cl. C11b 3/04
U.S. Cl. 252—182                                    20 Claims

ABSTRACT OF THE DISCLOSURE

The present invention relates to the process and composition for removal of proteinaceous fines from crude fat derivatives obtained by a rendering of animals, fowl, and the like by addition of certain compounds thereto capable of forming silicic acid in situ by reaction with fatty acids present in the fatty derivatives. The formed silicic acid settles through the fat derivatives to entrain and carry the proteinaceous fines downwardly leaving the clean fatty materials as a top layer.

---

The present invention relates to the treatment of crude fats, and more particularly to a process for the treatment of crude animal fats, to remove certain insoluble impurities therefrom in a new and novel manner, and to a treating composition for use with the crude tallow to make the removal of various impurities present therein possible in an efficient, safe and highly economical manner.

Animal fats in the form of tallow, lard, grease and the like are obtained by the rendering of slaughterhouse by-products, dead animals, dead chickens, and the like. The tallow, lard, grease or the like produced in this manner is a crude material which must be subsequently processed and refined to form other useful products, such as, for example, fatty acids, glycerides, soapstock, food materials, grease and the like. The crude material normally undergoes a period of storage and shipment, or shipment followed by storage, before further processing to produce the ultimate end products, since the manufacturers of the crude tallow are not normally the manufacturers of the ultimately marketed products.

The chemical make-up of the animal tallow produced in this manner and the necessity of storage and shipment presents certain fundamental problems that have necessitated much research toward the solution thereof. Crude animal tallow produced by any of the known rendering systems will be found to contain variable amounts of insoluble impurities. Such impurities are primarily proteinaceous in character and are referred to as "fines" in the industry. If such fines are permitted to remain in the tallow for any real length of time, such impurities cause and support an internal enzymatic action which results in the formation of free fatty acids. This enzymatic action is a continuing reaction and results in a rapid build-up of excessive free fatty acids in the crude animal tallow. This results in a crude tallow that is not stable in storage for any length of time. Moreover, such insoluble impurities and the resulting reaction will be found to tend to impair the color of the tallow. Therefore, with respect to the tallow, lard, grease and the like produced from animal fats, it is highly desirable and economically essential to remove the proteinaceous fines from the tallow as promptly as possible so as to produce a stable, high quality tallow. In fact, most specifications for tallow for various uses set forth a maximum permissible amount of fines that may be present in crude tallow as well as a maximum amount of free fatty acids that may be present therein. If such specifications are not met, the tallow is sold as an inferior grade at a greatly reduced price.

In an effort to solve this basic problem, various types of treatments have been employed heretofore in an effort to achieve the removal or neutralization of all or a greater proportion of the proteinaceous fines present in the crude tallow. Among such methods tried have been a settling operation in which the tallow is permitted to remain in storage and let the fines settle out. This type of treatment was unsatisfactory since it requires an excessive period of time and does not stop the enzymatic action and free fatty acid build-up during the settling period. Moreover, the prolonged settling does not result in a removal of a sufficient amount of the fines. Another type of treatment is the washing of the crude tallow with various chemicals, such as, for example, salt, sodium phosphate, and various lignin compounds in an effort to neutralize or otherwise precipitate the fines. This washing technique, while an improvement over straight settling, is also objectionable in that considerable equipment is needed to carry out the operation and considerable settling is required. Moreover, a sufficient amount of fines to result in a completely stable tallow is not achieved. Still other methods employed have been centrifuging the crude tallow or a filtering of the tallow. In centrifuging, considerable expensive equipment is required to carry out the operation and also an incomplete removal of fines is achieved. The filtering technique is slow in operation and is also undesirable since it results in a loss of the filter cake.

As a result, all of the prior processing operations employed to effect a clean-up of the crude tallow, grease or the like to remove the solid impurities therefrom and to prevent a free fatty acid build-up in the tallow has been far from satisfactory. Such prior systems have resulted in the use of expensive specialized equipment and only a somewhat incomplete removal of the fines or solid impurities, and have not achieved a material up-grading of the tallow. As a result, a considerable amount of tallow must be marketed at very low prices as a poor grade tallow simply as a result of the presence of an amount of fines greater than the normal specifications permit.

In accordance with the present invention, it has been found that the proteinaceous impurities or "fines" can be removed by adding a composition to crude tallow, grease or the like which will result in an acidulation of the principal component of the composition to produce a gelatinous or flocculent compound which will settle downwardly through the tallow and will carry any solid impurities therewith. More specifically, it has been found that the addition of certain silicates when added to the crude tallow, grease, lard or the like will result in an acidulation thereof to form silicic acid. The resulting silicic acid so formed is gel-like in its physical form and will settle rather rapidly to the lower portion of the treating tank carrying all solid impurities therewith in an entrained state. The top layer is very pure, and clear tallow is drawn off and may be stored indefinitely without fear of the material becoming unstable.

It is therefore a principal object of the presnt invention to provid crude animal tallow, lard, grease or the like that is substantially free from insoluble proteinaceous impurities.

Another object of the present invention is the production of animal tallow, lard, grease and the like which will not result in an excessive build-up of free fatty acids therein.

A further object of the present invention is the production of crude animal tallow, lard, grease and the like that is quite stable in storage.

Still another object of the present invention is the production of animal tallow, lard, grease and the like that is of very high quality that may be subsequently processed to produce edible and non-edible products.

A further object of the present invention is the production of animal tallow, lard, grease and the like which will meet all specifications as to purity, fatty acid content, and the like.

Still another object of the present invention is a method for the treatment of crude animal tallow, lard, grease and the like to remove the proteinaceous impurities therefrom.

Yet another object of the present invention is the provision of a composition for addition to animal tallow, lard, grease and the like to effect a rapid removal of proteinaceous impurities therefrom.

A still further object of the present invention is the provision of a composition for addition to animal tallow, lard, grease and the like to prevent the formation of excessive free fatty acids therein.

A further object of the present invention is the provision of a composition for addition to animal tallow, lard, grease and the like which will result in the production of a very stable tallow and the like.

Still another object of the present invention is a method for the treatment of animal tallow, lard, grease and the like prior to the refining of the tallow into its ultimate desired product.

Other and additional objects of the present invention will become manifest from the ensuing description.

THE COMPOSITION

Broadly stated, the composition made in accordance with the present invention and found suitable for use for addition to crude animal tallow, lard, grease, or the like for the effective removal of proteinaceous fines therefrom comprises the following compound by weight percent:

|  | Broad, percent | Preferred, percent | Specific, percent |
| --- | --- | --- | --- |
| Metal silicate | 30-95 | 50-75 | 60 |
| Buffering agent | 0.5-6 | 2.0-5.0 | 3.0 |
| Wetting agent | 0.0-1.0 | 0.1-.25 | 0.15 |
| Coupling agent | 0.0-5.0 | 0.5-4.0 | 2.0 |
| Water | (1) | (1) | (1) |

1 Balance.

The foregoing composition may be formulated with the particular ingredients being added in any desired order. The amount of the formulated composition to be employed in the treatment of the crude tallow will depend on the amount of proteinaceous fines present in the tallow. In general, it has been found that from about 0.5 to about 3.0 by weight percent of the crude tallow is sufficient to remove the proteinaceous fines found in most tallow. However, if there is an unusually large amount of fines present in the crude tallow, up to about 5% or higher may be employed.

In the marketing of the composition made in accordance with the present invention, such material is normally sold in the form of a water solution thereof. However, it is to be understood that it is within the spirit and scope of the present invention that the ingredients may be blended with one another and the composition so formed marketed in a dry state. When the composition in the dry state is to be used for treatment of the crude tallow, the composition is placed in solution with water and then added to the tallow. I might be, under certain circumstances, where there was an excessive amount of water present in the crude tallow, to add the treating composition of the present invention in dry form to the crude tallow. However, this latter form of use would be one that would be rarely employed.

The metal silicate

The function of the metal silicate in the composition of the present invention is to form a gel material in situ in the crude tallow. The formed gel will then settle down through the crude tallow to entrain the fines present in the tallow.

The metal silicates to be employed in the formulating of the compositions of the present invention in the light of the foregoing may be any metal silicate which upon contact with free acid present in an aqueous medium will result in the formation of silicic acid. The silicic acid so formed is what actually may be identified as hydrated silica having the formula $SiO_2 \cdot nH_2O$, although the formula $H_2SiO_3$ has often been used for sake of convenience. Silicic acid is gel-like in form and as a result of its physical characteristics has a large surface area and adsorbing characteristics.

When the composition of the present invention containing the metal silicate is added to the crude tallow, lard, grease or the like which will normally contain some free acid, the metal silicate will be converted into silicic acid. The gel-like silicic acid will then precipitate out and settle downwardly through the crude tallow, entraining and absorbing all of the insoluble proteinaceous fines present in the crude tallow. This will result in clear, substantially pure tallow free of proteinaceous fines, with the silicic acid carrying the fines settling below the tallow.

From the foregoing it will be seen that any metal silicate capable of being converted into silicic acid may be employed as the gel-forming material in the present invention. Suitable silicates are alkali metal silicates, such as, for example, sodium silicate, potassium silicate, alkaline earth metal silicates, aluminum silicate, iron silicate, and the like. Of these foregoing materials, the alkali metal silicates, and particularly sodium silicate, are the particular and preferred materials. The sodium silicate includes not only all sodium silicates of varying ratios of $NaO_2$ and $SiO_2$ and with varying proportions of water, but also includes the other soluble sodium silicates, such as, for example, sodium metasilicate, sodium sesquisilicate, sodium orthosilicate, etc. The sodium silicate is marketed, as hereinbefore indicated, in various ratios and with varying amounts of water, and is normally marketed as having a specified Baumé value for each grade. In the practice of the present invention 41° Baumé sodium silicate is the material most particularly preferred by reason of ready availability and cheapness in cost.

If desired, sodium silicate may be employed with other materials to form the gel when added to the crude tallow. For example, alum may be added to sodium silicate to form aluminum silicate, with the resulting aluminum silicate being then added to the crude tallow to form silicic acid therein. In carrying out this particular procedure, the formed aluminum silicate should be used promptly after being made since this material formed in this manner does not tend to remain stable for any long period of time.

As indicated hereinbefore, the metal silicate will be present in the composition in the broad range of 30-95%, and more particularly, in the range of 50-75%, with the preferred amount being about 60%. Care must be exercised that an excessive amount of the silicate in relation to the amount of free acid present is not employed, since such an over-abundance of silicate to acid will not result in the formation of silicic acid. In general, the amount of sodium silicate to be present in the crude tallow for acidulation thereof should be such that the alkalinity of the sodium silicate as $Na_2O$ does not exceed about 1⅔ times the amount of free acid present. An excess over this amount will prevent the formation of silicic acid.

If the alkalinity is in excess in the crude tallow, any suitable acid, otherwise compatible, may be added to the tallow to insure the formation of the silicic acid. Care must be exercised in selecting the acid to be used since such acid will be dependent upon the ultimate products to be obtained from the tallow. For example, if edible products are to be derived from the tallow, a food grade acid, such as, for example, food grade phosphoric acid, citric acid, or the like must be used. However, if food or like products are not to be obtained therefrom, any suitable inorganic or organic acid may be employed, such as, for example, hydrochloric acid, sulphuric acid, oleic acid, formic acid, acetic acid, oxalic acid, etc.

It will also be found necessary where there is little or no free acid present in the crude tallow to add acid to the tallow to insure the formation of silicic acid. The same degree of care is to be employed with respect to the acid to be added where an excess of alkalinity exists. The acids to be employed in this event may be any acid of the type hereinbefore enumerated.

The buffering agent

The buffering agent to be employed in the composition of the present invention functions to control or stabilize the hydroxyl ion concentration of the solution upon the acidulation of the silicate to insure the formation of silicic acid in the crude tallow. In general, upon the acidulation of the metal silicate a period of time is required for the formed silicic acid to settle. However, the hydroxyl ion concentration of the tallow solution will tend to convert back due to leaching out of the $NaO_2$. The presence of the buffering agent in the treating composition will effect a stabilization of the solution thereby insuring the silicic acid settling properly and carrying the entrained fines therewith.

There are many materials readily available commercially that may be employed as the buffering agent in formulating the compositions of the present invention. In utilizing a buffering agent, care must be exercised in selecting such material when the ultimate product to be obtained from the crude tallow is for human consumption. Under such circumstances, the buffering agent to be employed must be one that will impart no deleterious properties or otherwise harmful characteristics to the ultimately obtained product. In those cases where the ultimate end product obtained from the crude tallow is not to be used as an edible product, any suitable buffering agent may be employed.

Examples of suitable materials that may be employed as the buffering agent in the present invention are alkali metal and alkaline earth metal phosphates and carbonates, such as, for example, sodium phosphate, potassium phosphate, sodium carbonate, potassium carbonate, calcium phosphate, etc. Of these foregoing materials, the alkali metal phosphates are the preferred materials, primarily due to ready availability and cheapness in cost. Moreover, such materials may be safely used when the product to be ultimately derived from the crude tallow is going to be employed as an edible product. The particular and preferred material employed in the practice of the present invention is sodium phosphate, this term intending to include the various forms of sodium phosphate, such as, for example, sodium hexametaphosphate; sodium metaphosphate; sodium phosphate, monobasic; sodium phosphate, dibasic; sodium phosphate, tribasic; sodium pyrophosphate, etc. Of these various types just enumerated, sodium phosphate, dibasic and sodium phosphate, tribasic are the particular and preferred compounds to be employed as the buffering agent in the composition of the present invention.

As hereinbefore indicated, the buffering agent may be employed in the composition of the present invention in the broad range of 0.5–6.0%, the preferred range being 2.0–5.0%, and the particular specific amount being about 3.0%. It has been found that the buffering agent when employed within this range will effectively stabilize the acidulation so that the silicic acid will be formed and will remain in a gel-like state throughout its settling and carrying down of the entrained proteinaceous fines. Care should be exercised to insure that an excess of the buffering agent is not employed since too large an amount will tend to impair the efficiency of the formation of the silicic acid. It has been found that the enumerated range, in general, will insure the proper buffering action for the acidulation of the silicate in virtually all crude tallow, regardless of the condition of the crude tallow.

The wetting agent

In many instances it will be found desirable to employ a wetting agent in the formulation of the treating composition made in accordance with the present invention, although in many instances the wetting agent may be eliminated. The wetting agent when present will function in the composition made in accordance with the present invention as an aid in increasing the physical bulk of the proteinaceous fines, thereby facilitating the entrainment of such materials by the silicic acid. It has been found that the presence of a wetting agent in the composition of the present invention aids in the proteinaceous fines or particles picking up some silicate which will adhere thereto. This operation will tend to increase the physical bulk or size of the proteinaceous particles since the silicate adhering thereto will absorb some water. This bulk buil-up results in a physical enlargement of the proteinaceous fines or impurities, thus insuring a more ready entrainment of the particles by the silicic acid after it has been formed and starts its settling action. Thus, it is seen that the wetting agent primarily functions as an entraining aid to be employed in those situations where the proteinaceous fines exist in a very finely divided state. In those situations where the proteinaceous fines do not exist in this state, there will be no need to employ the wetting agents.

There are a great many wetting agents or surface active agents that are readily available commercially from quite a number of different manufacturers. The wetting agent to be employed preferably is water-soluble although those wetting agents that are readily dispersible in the aqueous solution may be employed. Care should be exercised in the selection of a wetting agent, when same is to be employed, where the ultimate end product to be derived from the crude tallow is for human consumption. The Food and Drug Administration of the Department of Health, Education and Welfare has compiled a list of wetting agents and surface active agents that have been found suitable for use in the processing of products which are for human consumption. Any of the wetting agents listed therein may be employed as a wetting agent in the formulation of the composition made in accordance with the present invention. If the ultimate end product to be derived from the crude tallow is not to be used for human consumption, any suitable wetting agent may be employed, if same is to be used in the composition of the present invention.

Suitable illustrative examples of wetting agents that may be employed, when same is to be used, in the formulation of the composition of the present invention without regard to the ultimate end product to be derived from the crude tallow, are fatty acid salts, salts of sulphated fatty acids, glycerol esters of a fatty acid, metal sulphates of fatty acids esters, metal sulphonates of fatty acid amides, metal alkyl sulphates, metal secondary alkyl sulphates, metal bi-sulphates of di-alkyl dicarboxylates, metal alkyl sulphonates, metal aryl sulphonates, metal alkyl aryl sulphonates, aryl ammoninum halides, alkyl aryl polyether alcohols. Suitable examples of specific wetting agents that may be employed in the practice of the present invention are oxyethylated adducts of tertiary octyl phenol, oxyethylated adducts of nonyl phenol having an oxyethylene content of about 65%, sulphonated alkyl naphthalene, sulphonated alkyl benzene sulphonate, sodium alkyl benzene sulphonate, diethanol oleic acid condensate, ethyl glycol, ethylene glycol monolaureate, polyoxyethylated nonyl phenol, mono- and di-ester mixture of alkyl aryl sodium sulphonate, sodium lauryl sulphate, sodium alkaryl sulphonates, marketed in a series under the trademark Nacconol by National Anoline Division of Allied Chemical Corporation, sodium alkyl naphthalene sulphonate marketed in a series under the trademark Nekal by Dyestuffs & Chemical Division of General Analine & Film Corporation, alkyl aryl ethers of polyethylene glycol marketed in a series under the trademark Tergitol by Union Carbide Corporation, glycerol monoricinoleate and adducts of castor oil marketed in a series under the trademark Surlactol by the Baker Castor Oil Company, a subsidiary of National Lead Company, nonyl phenol derivatives marketed in a series under the trademark Surfonic by Jefferson Chemical Company, etc.

As hereinbefore indicated, the wetting agent may be eliminated if its function is not required in the particular crude tallow undergoing treatment. In those instances where the presence of a wetting agent is desired, the material will be present in an amount up to no more than about 1.0%, with the preferred range being 0.1–0.25%, with the particular specific amount being 0.15%. It is to be found that this range is one that will impart the amount of wetting agent needed regardless of the condition of the tallow being treated.

The coupling agent

In many instances it will be found desirable to employ a coupling agent in formulating the composition of the present invention, although in many cases such a coupling agent will not be needed. In fact, with regard to certain crude tallows, the presence of the coupling agent has been found to have deleterious side effects. Therefore, the coupling agent is an optional material to be employed only where it is specifically needed. The coupling agent, when present, functions as a material to aid in increasing the size of the molecule of the protein of the fines, thereby enhancing and facilitating the entrainment of the fines during the settling of the formed silicic acid. Therefore, the coupling agent to be employed, when needed in the formulation of the composition of the present invention, may be any material which will tend to facilitate the growth of the protein molecule of the fines to increase the bulk thereof, thereby facilitating the entrainment of the proteinaceous fines.

Illustrative examples of suitable materials that may be employed in the practice of the present invention for aiding in precipitating out the proteins are the tannin derivatives, and more specifically, tannic acid, and other materials of this type that possess the property of aiding in precipitating out proteins may be employed. Care again must be exercised when using these materials since the ultimate product to be obtained from the crude tallow may be one that is manufactured for human consumption. Tannic acid has been found acceptable for use where the ultimate end product is to be used as a food. If the ultimate end product is not to be used as a food, obviously other protein precipitating materials may be employed.

As hereinbefore indicated, the coupling agent may not be employed in formulating the composition of the present invention. For example, in the treatment of poultry fat in accordance with the present invention, the coupling agent, and specifically tannic acid, should not be employed. The reason for this is that chicken fat treated with a composition made in accordance with the present invention and containing tannic acid will result in a tallow that has an extremely poor color. Therefore, in the treatment of crude chicken fat, tannic acid is not to be employed.

The amount of tannic acid to be used in the composition of the present invention is fairly small and is not to be present in an amount exceeding about 5.0%, with the preferred range being 0.5–4% and the particular and preferred amount being 2.0%. An excessive amount of the coupling agent present in the composition would not be harmful since its function primarily is to increase the protein molecule. However, from a standpoint of economics, the broad enumerated range herein set forth is one that has been found to be quite practical with respect to all forms of crude tallow with which the composition containing the coupling agent is to be employed.

EXAMPLES

Suitable illustrative examples of compositions made in accordance with the present invention which have been found to be of utility in purifying crude tallow are as follows:

Example 1

| | Percent |
|---|---|
| Sodium silicate | 60 |
| Sodium phosphate, tribasic | 2 |
| Oxyethylated adduct of tertiary octyl phenol | 0.1 |
| Water | Balance |

Example 2

| | Percent |
|---|---|
| Sodium silicate | 70 |
| Sodium phosphate, tribasic | 4 |
| Sulphonated ethyl benzene, Na salt | 0.2 |
| Water | Balance |

Example 3

| | Percent |
|---|---|
| Sodium silicate | 50 |
| Sodium phosphate, tribasic | 3.5 |
| Water | Balance |

Example 4

| | Percent |
|---|---|
| Sodium silicate | 67 |
| Sodium phosphate, tribasic | 3 |
| Water | Balance |

Example 5

| | Percent |
|---|---|
| Sodium silicate | 38 |
| Sodium phosphate, tribasic | 5 |
| Tannic acid | 1 |
| Water | Balance |

Example 6

| | Percent |
|---|---|
| Sodium silicate | 55 |
| Sodium, tribasic | 5 |
| Tannic acid | 2 |
| Water | Balance |

Example 7

| | Percent |
|---|---|
| Sodium silicate | 65.0 |
| Sodium phosphate, tribasic | 2.0 |
| Tannic acid | 1.5 |
| Surfactant CF–54 [1] | 0.1 |
| Water | Balance |

Example 8

| | Percent |
|---|---|
| Sodium silicate | 80 |
| Sodium phosphate, tribasic | 2.5 |
| Tannic acid | 3.0 |
| Ethylene glycol monolaurate | 0.8 |
| Water | Balance |

[1] A surface active agent marketed by Rohm & Haas, Philadelphia, Pa.

Example 9

| | Percent |
|---|---|
| Sodium silicate | 60 |
| Sodium phosphate, dibasic | 2 |
| Polyoxyethylated nonyl phenol | 0.1 |
| Water | Balance |

Example 10

| | Percent |
|---|---|
| Sodium silicate | 75 |
| Sodium phosphate, dibasic | 3 |
| Sodium lauryl sulphate | 0.5 |
| Water | Balance |

Example 11

| | Percent |
|---|---|
| Sodium silicate | 55 |
| Sodium phosphate, dibasic | 2.5 |
| Water | Balance |

Example 12

| | Percent |
|---|---|
| Sodium silicate | 62 |
| Sodium phosphate, dibasic | 3.5 |
| Water | Balance |

Example 13

| | Percent |
|---|---|
| Sodium silicate | 45 |
| Sodium phosphate, dibasic | 4 |
| Tannic acid | 2 |
| Water | Balance |

Example 14

| | Percent |
|---|---|
| Sodium silicate | 50 |
| Sodium phosphate, dibasic | 5 |

Example 15

| | Percent |
|---|---|
| Sodium silicate | 65.0 |
| Sodium phosphate, dibasic | 2.0 |
| Tannic acid | 1.5 |
| Surfactant CF-54 [1] | 0.7 |
| Water | Balance |

Example 16

| | Percent |
|---|---|
| Sodium silicate | 58 |
| Sodium phosphate, dibasic | 3 |
| Tannic acid | 1 |
| Sodium methyl naphthalene sulphate | 0.8 |
| Water | Balance |

Example 17

| | Percent |
|---|---|
| Potassium silicate | 60 |
| Sodium phosphate, dibasic | 2 |
| Ethyl phenyl ether of polyoxyethylene glycol | 0.1 |
| Water | Balance |

[1] A surface active agent marketed by Rohm & Haas, Philadelphia, Pa.

Example 18

| | Percent |
|---|---|
| Iron silicate | 71 |
| Sodium phosphate, tribasic | 3 |
| Glycerol monoricinoleate | 0.2 |
| Water | Balance |

Example 19

| | Percent |
|---|---|
| Tannic acid | 1 |
| Water | Balance |
| Sodium silicate | 50 |
| Potassium phosphate | 5 |
| Water | Balance |

Example 20

| | Percent |
|---|---|
| Potassium silicate | 65 |
| Sodium carbonate | 3 |
| Water | Balance |

Example 21

| | Percent |
|---|---|
| Aluminum silicate | 45 |
| Sodium hexametaphosphate | 5 |
| Tannic acid | 3.5 |
| Water | Balance |

Example 22

| | Percent |
|---|---|
| Potassium silicate | 60 |
| Sodium pyrophosphate | 4 |
| Tannic acid | 3 |
| Water | Balance |

Example 23

| | Percent |
|---|---|
| Potassium silicate | 65.0 |
| Calcium carbonate | 2.0 |
| Tannic acid | 1.5 |
| Dodecyl benzyl sodium sulphate | 0.1 |
| Water | Balance |

Example 24

| | Percent |
|---|---|
| Iron silicate | 70 |
| Potassium carbonate | 3 |
| Tannic acid | 2 |
| Ethyoxy adduct of castor oil | 1.0 |
| Water | Balance |

Example 25

| | Percent |
|---|---|
| Aluminum silicate | 40 |
| Sodium metaphosphate | 5 |
| Tannic acid | 2 |
| Water | Balance |

Example 26

| | Percent |
|---|---|
| Iron silicate | 55 |
| Sodium phosphate, monobasic | 4.5 |
| Tannic acid | 3.5 |
| Water | Balance |

Example 27

| | Percent |
|---|---|
| Aluminum silicate | 65.0 |
| Sodium pyrophosphate | 2.0 |
| Tannic acid | 1.5 |
| Ethylene oxide nonyl phenol | 0.1 |
| Water | Balance |

Example 28

| | Percent |
|---|---|
| Potassium silicate | 50 |
| Sodium metaphosphate | 3 |
| Tannic acid | 2 |
| Sodium lauryl sulphate | 0.5 |
| Water | Balance |

THE METHOD

In the utilization of the treating compositions of the present invention to effectively remove the proteinaceous fines from the crude tallow, lard, grease, or the like, several processing operations may be employed. In general, the crude tallow to be treated is passed to a treating zone which is generally in the form of a large treating tank or vessel. In general, water will be added to the crude tallow and the mixture placed under agitation. The purpose of the addition of the water is to insure that sufficient water is present to support the acidulation of the metal silicate. However, in certain instances sufficient entrained water may be carried by the crude tallow to support the reaction without the necessity of adding water. It has been found that as little as 1% by weight of water is sufficient to support the acidulation, although in many instances a greater amount may be required. In any event, when there is a question as to the amount of water present in the tallow, it will be found desirable to determine, by test, the water content of the crude allow prior to treament.

The crude tallow in the treating tank is heated to a temperature, either before or after the addition of water, which renders it fluid so that the water can be readily dispersed and the silicic acid formed can readily settle therethrough. The broad temperature range that can be employed is about 130° F. to about 212° F. Settling of the silicic acid occurs at a faster rate at the higher temperatures, but some tallow tends to froth at the higher temperatures. A preferred temperature range which will provide reasonably fast settling and will avoid frothing is about 160° to about 190° F.

The heated crude tallow is placed under agitation by any suitable means, such as, for example, a mechanical mixer, circulating pump, or the like. The purpose of the agitation is to insure a complete dispersion of the water through the crude tallow as well as subsequently placing the treating composition in complete admixture with the crude tallow. The treating composition, generally in solution or any other state as hereinbefore described, is added to the crude tallow and the agitation continued until the treating material is thoroughly dispersed throughout the tallow. If the crude tallow does not contain sufficient free acid, a suitable acid of the type hereinbefore indicated may be added to the tallow, either before or after the addition of the treating composition. In general, the period of agitation will be in the range of about 10 minutes up to about 30 minutes or longer.

Upon the completion of the agitation, the heat will be withdrawn from the reaction vessel and the crude tallow placed in a quiescent state. The silicic acid so formed in situ by the acidulation of the metal silicate in the treating composition was permitted to settle, which may require from 30 minutes to an hour or more. In most instances, the settling, however, will have been completed in about 45 minutes.

Upon completion of the settling period, it will be observed that three separate layers have been formed in the treating tank. The top layer will be found to be clear tallow having a reduced fatty acid content of improved color, free of proteinaceous fines, and which is quite stable in storage. The clean tallow may be siphoned off by suitable means such as, for example, a swing pipe immersed therein just above the top of the intermediate layer and pumped to a storage tank. The intermediate layer consists of the proteinaceous impurities or fines entrained with the silicic acid. This layer may be discarded, or if sufficient tallow or like particles are present, the layer may be returned to the raw material charging box for re-processing to reclaim any entrained tallow. The bottom layer consists of water and may be drained off and discarded.

By way of illustrating the process, the following examples are given showing the practice of the present invention in the treatment of crude tallow, lard, and the like:

Example A 10,000 lb. of tallow were pumped into a tank having a cone bottom, a swivel-draw-off pipe, a heating jacket and a mechanical agitator. Approximately 100 lb. of water were next added to the mixture after which the mixture was placed under agitation. Heat was applied to the mixture and the heating was continued until the mixture became warm, i.e., 150°–160° F. 100 lb. (1% by weight of the crude tallow) of a composition having the following formulation were slowly added to the crude tallow:

|  | Percent |
|---|---|
| Sodium silicate | 65 |
| Trisodium phosphate | 2 |
| Tannic acid | 1.5 |
| Wetting agent | 0.1 |

The crude tallow was maintained under agitation for approximately 15 minutes after which time the heat was cut off and the tallow mixture allowed to settle for a period of thirty minutes. Upon the addition of the treating composition, it was observed that a flocculent precipitate or gel-like mass was formed throughout the tallow mixture. The formed gel, after the agitation was terminated, settled rapidly leaving a top layer of clear tallow substantially free of all proteinaceous fines. The clear tallow was drawn off by means of the draw-off pipe and passed to storage. The fatty acid content of the recovered tallow as well as the insolubles and moisture content was found to be greatly reduced over that of the original tallow. The color of the recovered tallow was also materially improved and the tallow remained quite stable throughout the period of storage. The intermediate layer consisting of the impurities and the gel-like mass was recovered and returned to the raw stock bin for recovery of entrained tallow particles. The bottom layer of water was drawn off and discarded.

Example B 20,000 lbs. of animal tallow having a moisture content of 0.35% were heated to a temperature of 1–90° F. in a processing tank. 175 lbs. of water were added to the mass and while agitating the mass, 200 lbs. of an aqueous solution of a treating composition comprising the following ingredients by weight percent were added to the latter:

|  | Percent |
|---|---|
| Sodium silicate | 65 |
| Trisodium phosphate | 2 |
| Tannic acid | 1.5 |
| Water | Balance |

Agitation of the mixture was continued for 15 minutes, the heat removed from the processing tank, and the tallow allowed to settle for 45 minutes. The tallow layer was siphoned off and passed to storage by lowering a swing pipe down in the tallow layer until the interface of the intermediate layer was reached. The intermediate layer was passed to the raw stock bin for re-processing and the water layer discarded.

This batch of tallow had the following analysis:

|  | Before treatment | After treatment |
|---|---|---|
| Free fatty acids | [1] 4.6 | [1] 3.2 |
| Color (FAC) | 19 | 11A |
| Insolubles | [1] 1.12 | [1] 0.06 |
| Moisture | [1] 0.36 | [1] 0.19 |

[1] Percent.

Example C

A 10,000 lb. batch of edible steam rendered lard were heated in a tank to 165° F. and 100 lbs. of water added and the mixture placed under agitation. 100 lbs. of an aqueous solution of a treating composition comprising the following ingredients by weight percent were added:

|  | Percent |
|---|---|
| Sodium silicate | 60 |
| Trisodium phosphate | 3 |
| Tannic acid | 1.5 |
| Water | Balance |

Agitation of the tallow mixture was continued for 20 minutes and then 10 lbs. of food grade phosphoric acid diluted to 50% were added and the agitation continued another 10 minutes. On settling of the mass, the top layer of lard was crystal clear.

The batch of lard described above had the following analysis:

|  | Before treatment | After treatment |
|---|---|---|
| Free fatty acids | [1] 0.38 | [1] 0.12 |
| Color (FAC) | 5– | 1+ |
| Insolubles | [1] 0.16 | [1] 0.02 |
| Moisture | [1] 0.33 | [1] 0.16 |
| Color Lovibond-Red | 8 Red | 1 Red |

[1] Percent.

The foregoing establishes that compositions made in accordance with the present invention work exceptionally well on edible lard and also illustrates the use of an added acid to insure acidulation. The foregoing shows not only that it is possible to produce a lard free from insolubles, a lower free fatty acid content and a lighter FAC color, but the composition made in accordance with the present invention also reduces the lovibond red color substantially.

Example D 20,000 lbs. of poultry fat were heated in a batch tank to a temperature of 160° F. and placed under agitation. 400 lbs. of an aqueous solution containing the following ingredients by weight percent were added to the tallow mixture:

| | Percent |
|---|---|
| Sodium silicate | 60 |
| Trisodium phosphate | 3 |
| Wetting agent | 0.1 |
| Water | Balance |

Agitation of the tallow mixture was continued for 30 minutes after which time the heat was removed and the tallow permitted to settle for about 45 minutes. The top tallow layer was drawn off and passed to storage.

This batch of poultry fat had the following analysis:

| | Before treatment | After treatment |
|---|---|---|
| Free fatty acids | [1] 5.7 | [1] 3.6 |
| Color (FAC) | 21+ | 19— |
| Insolubles | [1] 4.82 | [1] 0.03 |
| Moisture | [1] 3.9 | [1] 0.21 |

[1] Percent.

Example E 20,000 lbs. of edible beef tallow were heated in a processing tank to a temperature of 160° F. and placed under a state of agitation for 15 minutes. 200 lb. of an aqueous solution of a composition having the following ingredients by weight percent were added to the tallow:

| | Percent |
|---|---|
| Sodium silicate | 65 |
| Sodium, phosphate, dibasic | 3 |
| Wetting agent | 0.1 |
| Tannic acid | 1.5 |
| Water | Balance |

The agitation of the tallow was continued for 5 minutes and it was observed that only a small amount of gel was formed which would be sufficient to effect an entrainment of the proteinaceous fines. 3 gallons of food grade phosphoric acid 85% were then slowly added to the crude tallow mixture and the mixture agitated for a period of 10 minutes. The addition of the phosphoric acid promtply resulted in the formation of the gel. The tallow mixture was permitted to settle for 30 minutes and the clear tallow siphoned off as the top layer of the mixture. The recovered tallow was found to have an excellent color and was free from any impurities and the free fatty acid content had been reduced from 0.36% to 0.12%.

The crude fat derivative employed as the feedstock in the present invention has been designated as tallow, lard, grease and the like. By such designation it is intended to include that product resulting from the rendering of cattle, hogs, horses, sheep, fowl, and the like. It is not intended to include any product resulting from the processing of vegetable materials since such resulting products would not contain any proteinaceous fines therein. Thus, the present invention relates solely to the treatment of crude fat derivatives obtained from animals and the like.

Tallow is that product resulting from the rendering of the fat from cattle, sheep, and horses and has, in general, solidifying points of 27–38° C. for beef tallow, 32–41° C. for sheep tallow, and from 20–45° C. for horse fat or tallow. Certain of the tallows obtained from cattle and sheep may be subsequently processed or refined to produce edible products. These particular tallows must be treated in the practice of the present invention with care insofar as the ingredients to be employed are concerned. Moreover, such tallows are usually obtained by a more careful and controlled rendering technique, and may not require the degree of "clean-up" that tallow to be employed in producing non-edible products would need. With tallow that is to be used for the production of non-edible products, any ingredients meeting the functional requirements of the components making up the composition may be employed.

Lard, in general, is a white, unctuous mass having a melting point of about 36–42° C. Such material is derived as the internal fat of the hog and normally used to produce edible products. As a result, crude lard is obtained by a rendering operation that is under careful supervision. Therefore, in treating crude lard, it will be found generally desirable to use only those ingredients in formulating the treating compositions made in accordance with the present invention that are safe for consumption.

Grease is also derived from hogs and is distinguished from lard in that grease is derived from a rendering of the entire hog fat. As a result, grease will not, in general, be employed as a source for the production of edible products. Therefore, in treating crude grease to remove the proteinaceous fines therefrom, care need not be exercised with respect to the ingredients employed to meet the requirements of the treating composition. However, in general, grease will be found to contain a greater amount of proteinaceous fines and therefore will require a more extensive "clean-up" operation. The present invention is of particular interest with respect to hog grease since such material will oftentimes be found to have variable amounts of material called "entrained glue," which is extremely difficult to remove. It has been found that treating compositions made in accordance with the present invention completely remove this glue and give an improved color and lower fatty acid content.

Poultry fat is intended to include any crude fat product derived from the rendering of any type fowl, such as, for example, chicken. In general, such crude fat material will be employed to produce non-edible products although edible products can be produced therefrom, if desired. In the treating of poultry fat in accordance with the precent invention, tannic acid or tannins cannot be employed as an ingredient in the treating composition since such material tends to darken the crude product after treatment. Accordingly, care must be exercised in formulating compositions to be used in the treatment of poultry fat.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A treating composition for removing proteinaceous fines from crude tallow, lard, grease, chicken fat, consisting essentially of the following ingredients by weight percent of the material treated:

| | Percent |
|---|---|
| Water-soluble metal silicate selected from the group consisting of alkali metal silicates and alkaline earth metal silicates | 30–95 |
| Buffering agent selected from the group consisting of alkali metal phosphates and alkaline earth metal phosphates | 0.5–6 |

2. A treating composition in accordance with claim 1, wherein sufficient water to place the composition in solution is present.

3. A treating composition in accordance with claim 1, wherein the composition includes up to about 1.0% of a wetting agent.

4. A treating composition in accordance with claim 1, wherein the composition includes up to about 5.0% of tannic acid as a coupling agent.

5. A treating composition in accordance with claim 2, wherein the composition includes up to about 1.0% of a wetting agent.

6. A treating composition in accordance with claim 2, wherein the composition includes up to about 5.0% of tannic acid as a coupling agent.

7. A treating composition in accordance with claim 2, wherein the composition consists essentially of the following ingredients:

| | Percent |
|---|---|
| Water-soluble metal silicate selected from the group consisting of alkali metal silicates and alkaline earth metal silicates | 50–75 |
| Buffering agent selected from the group consisting of alkali metal phosphates and alkaline earth metal phosphates | 2.0–5.0 |
| Water | Balance. |

8. A treating composition in accordance with claim 7, wherein a wetting agent in the amount of 0.1 to 0.25% is added.

9. A treating composition in accordance with claim 7, wherein a wetting agent in the amount of 0.1 to 0.25% and tannic acid as a coupling agent in the amount of 0.5 to 4.0% are added.

10. A treating composition in accordance with claim 2, wherein said metal silicate is an alkali metal silicate.

11. A treating composition in accordance with claim 2, wherein said buffering agent is an alkali metal phosphate.

12. A treating composition in accordance with claim 2, wherein said buffering agent is a sodium phosphate.

13. A treating composition is accordance with claim 2, wherein said metal silicate is sodium silicate.

14. A treating composition in accordance with claim 2, wherein said metal silicate is sodium silicate and said buffering agent is sodium phosphate.

15. A treating composition in accordance with claim 10, wherein tannic acid in the amount of 0.5% to 4.0% is added as a coupling agent.

16. A treating composition in accordance with claim 10, wherein a wetting agent in the amount of 0.1% to 0.25% is added.

17. A treating composition in accordance with claim 10, wherein tannic acid in the amount of 0.5% to 4.0% as a coupling agent and a wetting agent in the amount of 0.1% to 0.25% are added.

18. A treating composition in accordance with claim 14, wherein tannic acid in the amount of 0.5% to 4.0% is added as a coupling agent.

19. A treating composition in accordance with claim 14, wherein a wetting agent in the amount of 0.1% to 0.25% is added.

20. A treating composition in accordance with claim 14, wherein tannic acid in the amount of 0.5% to 4.0% as a coupling agent and a wetting agent in the amount of 0.1% to 0.25% are added.

References Cited

UNITED STATES PATENTS 3,427,249  2/1969  Reids et al. _____ 252—184

OTHER REFERENCES

Andersen, Refining of Oils and Fats, Second Edition, 1962, MacMillan Company, pp. 52, 55, and 85.

LEON D. ROSDOL, Primary Examiner

I. GLUCK, Assistant Examiner

U.S. Cl. X.R.

99—118; 252—184; 260—420, 424